United States Patent
Jha et al.

(10) Patent No.: US 12,505,539 B2
(45) Date of Patent: Dec. 23, 2025

(54) CELL BODY SEGMENTATION USING MACHINE LEARNING

(71) Applicant: APPLIED MATERIALS, INC., Santa Clara, CA (US)

(72) Inventors: Sumit Kumar Jha, Bangalore (IN); Dan Xie, Pleasanton, CA (US); Arina Nikitina, Samara (RU); Debjit Ray, Santa Clara, CA (US); Yun-Ching Chang, San Jose, CA (US); Suraj Rengarajan, Bangalore (IN)

(73) Assignee: Applied Materials, Inc., Santa Clara, CA (US)

( * ) Notice: Subject to any disclaimer, the term of this patent is extended or adjusted under 35 U.S.C. 154(b) by 405 days.

(21) Appl. No.: 18/096,835

(22) Filed: Jan. 13, 2023

(65) Prior Publication Data

US 2023/0230234 A1 Jul. 20, 2023

Related U.S. Application Data

(60) Provisional application No. 63/301,220, filed on Jan. 20, 2022.

(51) Int. Cl.
  *G06T 7/00* (2017.01)
  *G06T 5/00* (2024.01)
  *G06T 5/70* (2024.01)
  *G06T 7/11* (2017.01)
  *G06V 10/82* (2022.01)
  *G06V 20/70* (2022.01)

(52) U.S. Cl.
  CPC ............. *G06T 7/0012* (2013.01); *G06T 5/70* (2024.01); *G06T 7/11* (2017.01); *G06V 10/82* (2022.01);
  (Continued)

(58) Field of Classification Search
  CPC . G06T 7/0012; G06T 7/10; G06T 7/11; G06T 7/246; G06T 5/60; G06T 5/00;
  (Continued)

(56) References Cited

U.S. PATENT DOCUMENTS

2014/0314299 A1* 10/2014 Santamaria-Pang ......................... G06T 7/0012 382/133
2017/0103521 A1* 4/2017 Chukka ................ G06V 20/695
(Continued)

FOREIGN PATENT DOCUMENTS

KR 10-2021-0000215 A 1/2021

OTHER PUBLICATIONS

Al-Kofahi, Yousef et al., "A deep learning-based algorithm for 2-D cell segmentation in microscopy images", BMC Bioinformatics, 2018, vol. 19, article No. 365, pp. 1-11. https://doi.org/10.1186/s12859-018-2375-z.

(Continued)

*Primary Examiner* — Oneal R Mistry
*Assistant Examiner* — Duy Tran
(74) *Attorney, Agent, or Firm* — Lowenstein Sandler LLP

(57) ABSTRACT

A system and method of performing deep cell body segmentation on a biological sample is provided. The method includes receiving a first and a second stained image. The first image is processed using a trained machine learned model that outputs locations of a plurality of cell nuclei in the first stained image. Seed points are then determined based on the locations of the plurality of cell nuclei. The second image is then processed using the seed points to determine a plurality of cell membranes using a watershed segmentation. The second image is then post-processed and an output image is produced. The output image is then analyzed and gene sequencing is performed.

16 Claims, 7 Drawing Sheets

(52) U.S. Cl.
CPC .... *G06V 20/70* (2022.01); *G06T 2207/30024* (2013.01)

(58) Field of Classification Search
CPC ....... G06T 2207/30024; G06T 2210/41; G06T 2207/30004; G06T 7/70; G06V 20/69; G06V 20/695; G06V 20/698; G06V 20/70; G06V 20/80; G06V 10/809; G06V 10/82; G06V 2201/03; G06V 10/44; G06V 2201/04
See application file for complete search history.

(56) References Cited

U.S. PATENT DOCUMENTS

| | | | |
|---|---|---|---|
| 2019/0147215 A1* | 5/2019 | Al-Kofahi | G06T 7/11 382/133 |
| 2020/0193139 A1* | 6/2020 | Behrooz | G06T 7/12 |
| 2021/0216746 A1* | 7/2021 | Nie | G06V 20/698 |
| 2022/0012884 A1* | 1/2022 | Shin | G06T 7/0012 |

OTHER PUBLICATIONS

Lee, Michael Y. et al., "CellSeg: a robust, pre-trained nucleus segmentation and pixel quantification software for highly multiplexed fluorescence images", BMC Bioinformatics, 2022, vol. 23, article No. 46, pp. 1-17. https://doi.org/10.1186/s12859-022-04570-9.

Lee, Kyubum et al., "Deep Learning of Histopathology Images at the Single Cell Level", Frontiers in Artificial Intelligence, 2021, vol. 4, article No. 754641, pp. 1-14. doi: 10.3389/frai.2021.754641.

PCT International Search Report and Written Opinion for International Application No. PCT/US2023/011167, mailed May 2, 2023, 9 pages.

* cited by examiner

CELL BODY SEGMENTATION USING MACHINE LEARNING

CROSS REFERENCE TO RELATED APPLICATION(S)

The present application claims priority to U.S. Provisional Patent Application No. 63/301,220 filed on Jan. 20, 2022, the entire contents of which are incorporated herein in its entirety.

FIELD

The disclosure relates generally to cell body segmentation, and more specifically to a technique for cell body segmentation that automatically identifies cell nuclei and cell membranes around the cell nuclei.

BACKGROUND

In cell transcriptomics analysis, whole sections of tissue in a sample may be crushed and run through an analyzer to receive information on how each gene is expressed in the sample. This information allows for a general understanding of the gene expression in the tissue, but does not provide information on each individual cell. By gathering information on a single cell, one can study and understand the cell itself, rather than the tissue sample. Currently, methods to detect either the nuclei or membrane of a cell rely on manual input by a user, and are difficult and time consuming to perform. Thus, both precise nuclei detection and precise cell membrane detection are very useful but difficult and time consuming to achieve, with much manual input by a user. Nuclei detection and cell membrane detection are presently separately performed based on tuning many different parameters of multiple systems to apply to specific narrow at-hand use cases, to achieve systems that have narrow applicability to just those narrow use cases.

BRIEF SUMMARY

According to various embodiments, disclosed herein is a method for performing a deep cell body segmentation that can be used across various biological sample types, such as various cell lines or tissues with tuning of a single parameter. The method may include training a deep neural network to identify cell nuclei, and then automatically identifying cell membranes around each cell nuclei using a watershed technique or other similar technique.

In one embodiment, a method is provided comprising receiving a first image of a first stained sample and a second image of a second stained sample, processing the first image with a trained machine learned model, wherein the trained machine learning model outputs locations of a plurality of cell nuclei in the first stained image, determining a plurality of seed points based on the locations of the plurality of cell nuclei, wherein each cell nuclei of the plurality of cell nuclei is associated with a seed point of the plurality of seed points, and processing the second image using the plurality of seed points to determine a plurality of cell membranes, wherein each cell membrane of the plurality of cell membranes is associated with a cell nuclei of the plurality of cell nuclei.

In some embodiments, the method may also comprise setting an average cell size parameter of the trained machine learning model prior to processing the first image.

In some embodiments of the method, processing the second image comprises performing a watershed segmentation process.

In one embodiment, the method may further include after processing the second image, performing one or more post-processing operations on the second image.

In one embodiment, the one or more post-processing operations include smoothing boundaries representing one or more cell membranes of the plurality of cell membranes.

In an additional embodiment, the one or more post-processing operations include removing a boundary representing a grouping of a subset of the plurality of cells.

In one embodiment, the method may further comprise generating an output image comprising labels for the plurality of cell nuclei and the plurality of cell membranes.

In some embodiments, the method may further comprise determining sequences of a cell in the output image, wherein the sequences are in an area within a cell membrane of the cell, the cell membrane being one of the plurality of cell membranes.

In an embodiment, the first image is stained using a DAPI (4',6-diamidino-2-phenylindole) stain, and wherein the second image is stained using a membrane stain.

In one embodiment, the machine learned model comprises a Mask R-CNN neural network.

In some embodiments, the method may further include gathering a biological sample, incubating the biological sample with a reagent, and obtaining a plurality of images of the biological sample, the plurality of images comprising the first image and the second image.

In some embodiments, the biological sample includes a tissue resection, a biopsy or cells grown in culture.

According to another embodiment of the present disclosure, a system is provided. The system comprises a memory, and a processing device operatively coupled to the memory, the processing device configured to: receive a first image of a first stained sample and a second image of a second stained sample; process the first image with a trained machine learned model, wherein the trained machine learning model outputs locations of a plurality of cell nuclei in the first image; determine a plurality of seed points based on the locations of the plurality of cell nuclei, wherein each cell nuclei of the plurality of cell nuclei is associated with a seed point of the plurality of seed points; and processing the second image using the plurality of seed points to determine a plurality of cell membranes, wherein each cell membrane of the plurality of cell membranes is associated with a cell nuclei of the plurality of cell nuclei.

In some embodiments of the system, the processing device is configured to receive a setting of an average cell size parameter of the trained machine learning model prior to processing the first image.

In some embodiments of the system, the processing device is configured to perform a watershed segmentation process on the second image.

In some embodiments of the system, the processing device is configured to perform one or more post-processing operations on the second image.

In some embodiments of the system, the one or more post-processing operations include smoothing boundaries representing one or more cell membranes of the plurality of cell membranes, removing a boundary representing a grouping of a subset of the plurality of cells, or a combination thereof.

In another embodiment of the system, the processing device is configured to generate an output image including labels for the plurality of cell nuclei and the plurality of cell membranes.

In another embodiment of the system, the processing device is configured to determine sequences of a cell in the output image, wherein the sequences are in an area within a cell membrane of the cell, the cell membrane being one of the plurality of cell membranes.

In another embodiment of the present disclosure, a non-transitory computer-readable medium is provided. The non-transitory computer-readable medium includes instructions that, when executed by a processor, cause the processor to perform operations comprising: receiving a first image of a first stained sample and a second image of a second stained sample; processing the first image with a trained machine learned model, wherein the trained machine learning model outputs locations of a plurality of cell nuclei in the first stained image; determining a plurality of seed points based on the locations of the plurality of cell nuclei, wherein each cell nuclei of the plurality of cell nuclei is associated with a seed point of the plurality of seed points; and processing the second image using the plurality of seed points to determine a plurality of cell membranes, wherein each cell membrane of the plurality of cell membranes is associated with a cell nuclei of the plurality of cell nuclei.

BRIEF DESCRIPTION OF THE DRAWINGS

The present disclosure is illustrated by way of example, and not by way of limitation, in the figures of the accompanying drawings in which like references indicate similar elements.

DETAILED DESCRIPTION

Figure 1A:
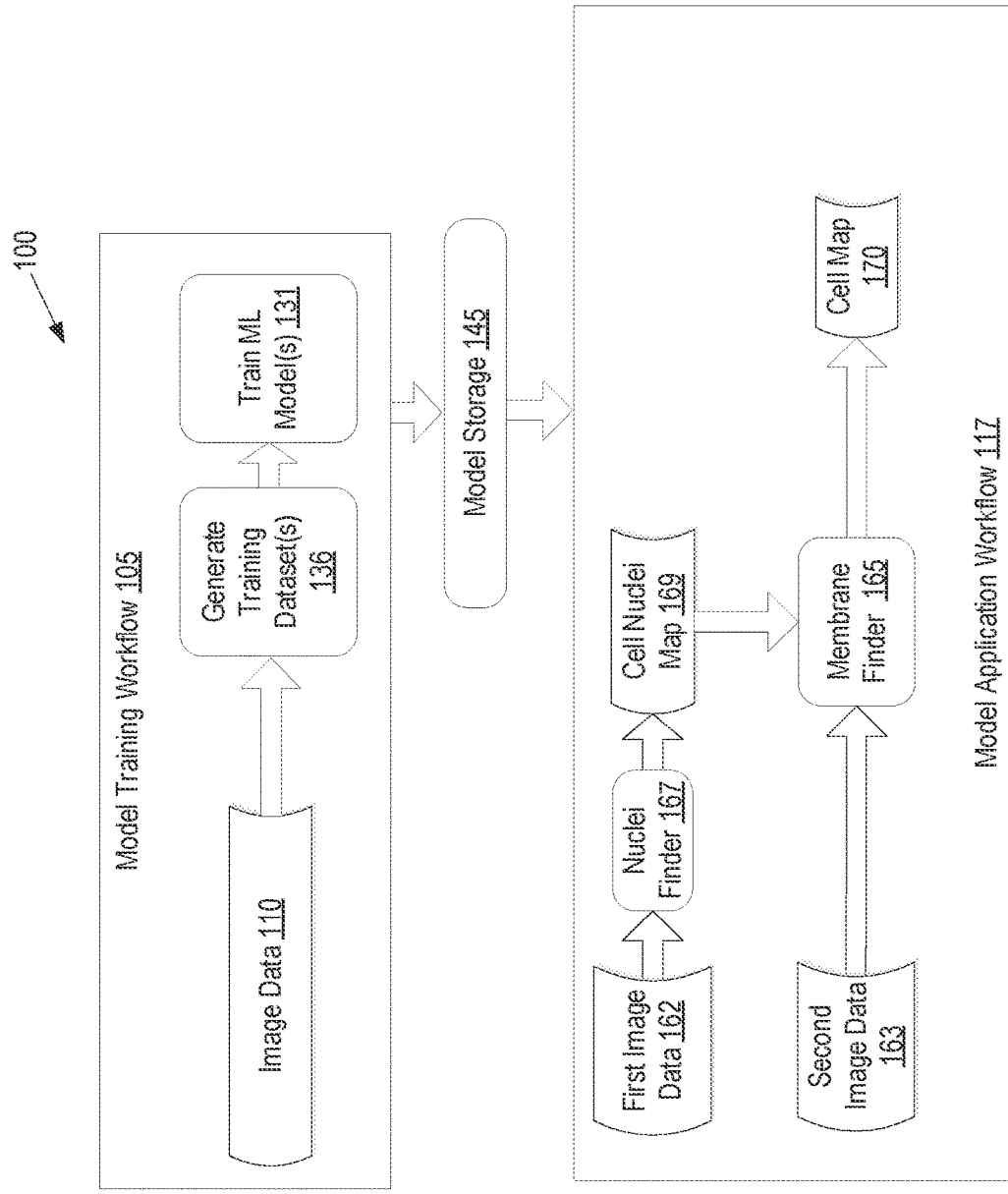
FIG. 1A illustrates a model training workflow and a model application workflow for a cell segmentation system according to aspects of the disclosure.

Embodiments described herein provide a system and method for automatically performing cell body segmentation for samples such as biological samples. The method may analyze an image for both nuclei and cell membranes using a trained machine learning model. In embodiments, an image stained to emphasize the nuclei is processed using a trained machine learning model that segments the nuclei, and the segmented nuclei information is added to an additional image stained to emphasize cell membranes. The augmented additional image is then processed (e.g., using a second trained machine learning model and/or a watershed algorithm) to segment the cell membranes. The cell nuclei and cell membrane segmentation information may then be used to map gene information in a biological sample.

As used herein, the term "single cell" or "cell" refers to one cell composed of nuclei and membrane and other cellular components. Thus, a single cell includes a nuclei within a membrane.

As used herein, the term "deep cell body segmentation" or "cell body segmentation" refers to machine learning algorithms that use a cascade of multiple layers of nonlinear processing units for feature extraction and transformation as described herein.

According to an embodiment of the present disclosure, cell body segmentation may be used with transcriptomics (the study of the transcriptome, which is the complete set of RNA transcripts that are produced by the genome, under specific conditions or in a specific cell), which allows for one of skill in the art to be able to analyze each cell in a sample. By analyzing each cell in a sample, one of skill in the art may be able to understand how many different varieties of cells are in the sample and/or perform analysis on those cells. To perform analysis of cells in a sample, the cells may be segmented, such that each of the cells are quantified. This can include identifying the nuclei of each cell as well as the borders of a cell membrane of each cell. Once the cells are quantified, this allows a user to analyze the genes in each cell. The cell body segmentation of the present disclosure provides a method and system to identify one or more cells, by detecting both the nuclei and a membrane around the nuclei for each of the cells. The methods and systems of the present disclosure provide a more efficient and effective mapping of the gene information of the cell than conventional methods.

According to an embodiment of the present disclosure, the cell body segmentation may be used across various cell lines to produce higher image resolutions than previous methods. The cell body segmentation may also be performed by adjusting a single parameter in a trained machine learning model. In previous cell body segmentation processes, several parameters are inputted into a model to enable identification of the nuclei or the membranes of a particular class of cell. In the present disclosure, the single parameter to be inputted into the model may be an average cell size. The cell body segmentation in embodiments of the present disclosure treats nuclei identification and membrane segmentation as related tasks by using a geometric constraint of cells, wherein each nucleus will be inside a membrane boundary of a cell. Thus, the cell body segmentation of embodiments of the present disclosure provides a complete cell body segmentation, uses a single parameter for tuning, is generalized across various cell lines, and may support any image dimension. In contrast, previous solutions require inputting several parameters for tuning and can only be used across specific cell lines.

The cell body segmentation of embodiments of the present disclosure may process a variety of imaging modalities, and be used with a variety of stain protocols and/or antibody selections. The segmentation of the nuclei and/or cell membranes may also be performed using one or more graphics processing unit (GPU), each of which may process images having an image dimension of thousands of pixels. In embodiments, multiple GPUs may be used in parallel. For example, an image may be divided into image patches, and one or more of the images patches may be processed by a separate GPU in parallel. Once one or more GPUs perform segmentation, one or more central processing unit(s) (CPUs) may execute a watershed algorithm. The cell body segmentation may also be highly efficient and scalable, i.e., it can be performed on several images having a large pixel count down to a small pixel count.

In some embodiments of the present disclosure, machine learning may be used to classify and/or delineate the nuclei and/or membrane of the individual cells in a biological sample. In some embodiments, a trained machine learning model (e.g., such as a deep neural network, convolutional neural network, etc.) may be trained to generate a map of nuclei locations from input images of biological samples. In some embodiments, the trained machine learning model may be a convolutional neural network. In some embodiments, the trained machine learning model can predict labels directly from an input image that is generated by scanning a sample in a microscope.

Referring now to the figures, FIG. 1A illustrates a model training workflow 105 and a model application workflow 117 for a cell segmentation system, according to aspects of the disclosure. In some embodiments, the model training workflow 105 may be performed at a server which may or may not include a cell body segmentation component (e.g., such as a cell body segmentation component or application 690 of FIG. 6), and the trained models are provided to the cell body segmentation component, which may perform the model application workflow 117. The model training workflow 105 and the model application workflow 117 may be performed by processing logic executed by a processor of a computing device. One or more of these workflows 105, 117 may be implemented, for example, by one or more machine learning modules implemented on a processing device and/or other software and/or firmware executing on a processing device.

The model training workflow 105 is to train one or more machine learning models (e.g., deep learning models) to identify, classify and/or segment cell nuclei from images of samples such as biological samples. The images may be stained images, which may be images of stained biological samples, where the stain may emphasize certain features of the biological samples (e.g., such as the cell nuclei and/or the cell membranes of cells in the imaged biological sample). The model application workflow 117 is to apply the one or more trained machine learning models to perform cell nuclei identification/classification/segmentation and/or cell membrane identification/classification/segmentation.

Various machine learning outputs are described herein. Particular numbers and arrangements of machine learning models are described and shown. However, it should be understood that the number and type of machine learning models that are used and the arrangement of such machine learning models can be modified to achieve the same or similar end results. Accordingly, the arrangements of machine learning models that are described and shown are merely examples and should not be construed as limiting.

In embodiments, one or more machine learning models are trained to perform one or more of the below tasks. Each task may be performed by a separate machine learning model. Alternatively, a single machine learning model may perform each of the tasks or a subset of the tasks. Additionally, or alternatively, different machine learning models may be trained to perform different combinations of the tasks. In an example, one or a few machine learning models may be trained, where the trained machine learning (ML) model is a single shared neural network that has multiple shared layers and multiple higher level distinct output layers, where each of the output layers outputs a different prediction, classification, identification, etc. The tasks that the one or more trained machine learning models may be trained to perform may include cell nuclei identification/classification and/or cell membrane identification/classification, as set forth above.

One type of machine learning model that may be used to perform some or all of the above tasks is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g., classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarch of layers, where the different layers learn different levels of representations that correspond to different levels of abstraction. In deep learning, each level learns to transform its input data into a slightly more abstract and composite representation. In an image recognition application, for example, the raw input may be a matrix of pixels, the first representational layer may abstract the pixels and encode edges, the second layer may compose and encode arrangements of edges, and the third layer may encode higher level shapes (e.g., nuclei and/or seed point). Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In one embodiment, a convolutional neural network (CNN) is used for one or more machine learning models. In one embodiment, a Mask R-CNN is used for one or more machine learning models. Mask R-CNN is a type of region-based CNN (R-CNN) that is able to detect target objects in an image and generate a segmentation mask for each instance of the target objects that is detected. An R-CNN utilizes bounding boxes across object regions, and evaluates convolutional networks independently on all regions of interest (ROI) to classify multiple image regions into one or more proposed classes.

There are two main types of image segmentation that may be performed: semantic segmentation and instance segmentation. During semantic segmentation, each pixel of an image is classified into a fixed set of categories without differentiating target objects. That is, semantic segmentation classifies similar objects at the pixel level. Semantic segmentation may also be known as background segmentation because target objects are separated from the background of the image. Instance segmentation deals with the correct detection of all objects in an image while also precisely segmenting each instance. During instance segmentation, detection of each instance of the target object is performed. Thus, instance segmentation distinguishes each object that may have been identified as one combined object during semantic segmentation. Instance segmentation may also be known as foreground segmentation because it accentuates the target objects of the image from the background.

When Mask R-CNN processes an image, two stages are undergone. In the first stage, proposals about the regions where there might be an object are generated based on the input image. In the second stage, the Mask R-CNN predicts the class of object, refines the bounding box and generates a mask in a pixel level of the object based on the first stage proposal. Mask R-CNN is an extension of Faster R-CNN and works by adding a branch for predicting an object mask (Region of Interest) in parallel with the existing branch for bounding box recognition.

Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and back-propagation to tune the weights of the network across all its layers and nodes such that the error is minimized. In many applications, repeating this process across the many labeled inputs in the training dataset yields a network that can produce a correct output when presented with inputs that are different than the ones present in the training dataset. In high-dimensional settings, such as large images, this generalization is achieved when a sufficiently large and diverse training dataset is made available.

For the model training workflow 105, a training dataset containing hundreds, thousands, tens of thousands, hundreds of thousands or more stained images (e.g., images of stained samples) 110 should be used to form a training dataset. Each of the stained images may include labels of the cell nuclei in the stained images. In embodiments, raw nuclei images may be cropped from raw nuclei data. Cells may be automatically or manually labelled on the raw nuclei images. That is, a user may circle the nuclei on the cells and assign labels to them. This data may be processed to generate one or multiple training datasets 136 for training of one or more machine learning models. The machine learning models may be trained, for example, to automate cell body segmentation.

To effectuate training, processing logic inputs the training dataset(s) 136 into one or more untrained machine learning models. Prior to inputting a first input into a machine learning model, the machine learning model may be initialized, such as with random weights and/or pre-trained weights, wherein pre-trained weights are generated from previous training of the machine learning model. Processing logic trains the untrained machine learning model(s) based on the training dataset(s) to generate one or more trained machine learning models that perform various operations as set forth above.

Training may be performed by inputting one or more of the stained images (e.g., image data 110) into the untrained ML model. The machine learning model processes the input to generate an output. An artificial neural network includes an input layer that consists of values in a data point. The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer, where there is one node for each class or output that the machine learning model can produce.

Accordingly, the output may include one or more classifications of cell nuclei. For example, an output may include pixel locations of one or more cell nuclei, and may include separate labels for each of the different cell nuclei. In one embodiment, the output includes a one or more segmentation mask, where the segmentation mask includes values for each pixel in the image. For example, a value of 0 may indicate that a pixel is not associated with any nucleus, a value of 1 may indicate that a pixel is associated with a first nucleus, a value of 2 may indicate that a pixel is associated with a second nucleus, and so on. Processing logic may compare the identified nuclei against a label indicating actual known positions of the nuclei. Processing logic determines an error (i.e., a classification error) based on the differences between the classified nuclei locations and the known nuclei locations. Processing logic adjusts weights of one or more nodes in the machine learning model based on the error. An error term or delta may be determined for each node in the artificial neural network. Based on this error, the artificial neural network adjusts one or more of its parameters for one or more of its nodes (the weights for one or more inputs of a node). Parameters may be updated in a back-propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

Once the model parameters have been optimized, model validation may be performed to determine whether the model has improved and to determine a current accuracy of the deep learning model. After one or more rounds of training, processing logic may determine whether a stopping criterion has been met. A stopping criterion may be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 80% or 90% accuracy. In one embodiment, the stopping criterion is met if accuracy of the machine learning model has stopped improving. If the stopping criterion has not been met, further training is performed. If the stopping criterion has been met, training may be complete. Once the machine learning model is trained, a reserved portion of the training dataset may be used to test the model. In some embodiments, different models may be trained for different cell types that are to be analyzed in biological samples.

In one embodiment, a machine learning model (e.g., nuclei finder 167) may be trained to detect nuclei. In one embodiment, a CNN such as a region-based CNN (R-CNN) or a Mask R-CNN model may be used to detect nuclei in the image. The Mask R-CNN may identify each cell nuclei in an image and output a segmentation mask for each of the nuclei. This may include a single segmentation mask that separately identifies each of the different nuclei or a separate mask for each nuclei.

The process performed by model application workflow 117 may be referred to as cell body segmentation, and may include performing deep cell body segmentation. In one embodiment, the deep cell body segmentation begins with first image data 162 having nuclei information, second image data 163 having membrane information, and optionally setting a single parameter of average cell size for nuclei finder 167.

For model application workflow 117, according to one embodiment, first image data 162 and second image data 163 may be generated of a sample (e.g., a biological sample). In one embodiment, a biological sample may be obtained for gene sequencing analysis. The biological sample may be for example, a tissue resection, a biopsy or cells grown in culture. Depending on a target gene to be analyzed in the sample, an mRNA probe library may be available for obtaining target mRNA probes. The mRNA probes may include oligonucleotide sequences that correspond to specific genes. The target gene is the gene in which a user is interested in detecting in the cells of a sample. In order to determine if a target gene is present in a sample, the mRNA probe should have the specific oligonucleotide sequence so it can bind to that gene in the cell. To prepare the sample for gene analysis, the sample may be incubated with a reagent of the target mRNA probe. During incubation, the target mRNA may attach to the cells in the sample. When the target mRNA probe attaches to the cell, it is shown in the image as a specific color when the image is processed in a subsequent step. The sample may be incubated for a threshold amount of time to ensure the target mRNA probes attach to the cells. In one embodiment, the threshold amount of time is about 15 minutes, about 30 minutes, about 45 minutes or about 60 minutes.

After incubation, the sample may be placed on a multiplex imaging device, such as a fluorescence microscope. The multiplex imaging device may be used to obtain a plurality of different combinations of images and/or imaging parameters. The fluorescent imaging may be performed by dying the sample with different dyes to identify the nuclei and membrane. Thus, image processing with the multiplex imaging device may provide spatial and expression information, but does not identify the membrane at this stage. The first image data 162 with the nuclei information (i.e. a nuclei image) may show the nuclei of the cell based on a particular dye, while the second image data 163 with the membrane information (i.e. a membrane image) may show the membrane of the cell based on a different dye. In some embodiments of the present disclosure, the nuclei image and the membrane image may be dyed with different colors to better represent the nuclei and membrane of the cell, respectively. In some embodiments, the nuclei image is stained using DAPI (4',6-diamidino-2-phenylindole) stain. In some embodiments, the membrane image is stained using a membrane stain. In one embodiment, the membrane stain is ECAD 488.

In some embodiments, an image is produced that contains the gene information, another image is produced that contains the nuclei information and a third image is produced containing the membrane information. In the method of the present disclosure, the nuclei image and membrane image may be used to detect a complete membrane, where the image containing gene information may be super imposed with the images containing membrane and/or nuclei information. This method allows a user to learn the content of each cell and how many target genes are present in a sample because the membrane is identified.

The first image data 162 may be generated after a first stain has been applied to the biological sample (referred to as a first stained image), and the second image data 163 may be generated after a second stain has been applied to the biological sample (referred to as a second stained image). The first stain may emphasize cell nuclei, and the second stain may emphasize cell membranes.

In some embodiments, the trained ML model(s) used by nuclei finder 167 may be trained to operate on images having a specific size or a size within a size range.

A generated image of a sample may be preprocessed and decoded. During pre-processing, an amount of pixels in the image may be analyzed. Depending on a size of the image, the image may benefit from being separated or divided into patches to undergo deep cell body segmentation. For example, images greater than a threshold size may be too large for a GPU to process. To determine if an image is too large for a GPU to process, a target or threshold size may be provided. If the image size is greater than the target or threshold size, then the image may be divided into patches. The target size may be 512×512 pixels or 1024×1024 pixels in embodiments. For example, if the image is about 20,000× 20,000 pixels and the target size is 512×512 pixels, then the image may be divided into patches for further processing with a graphic processing unit (GPU). When the image is to be patched (divided into patches), overlapping patches may be formed to ensure that a full image is analyzed when patches are stitched back together. The method of the present disclosure has been optimized so that artifacts are minimized when the image is stitched back together. If the image size is less than the target size, then the image may be padded (for example, additional pixels having a value of 0 are added to the image) so that the image matches the target size. Once the target size is achieved, the nuclei segmentation code may be run. The image may be preprocessed before undergoing cell body segmentation. During preprocessing, each nuclei may have received a mask and each mask may have a label associated with a distinct cell. These labels may represent the seed points that are used for membrane segmentation. The label, or seed point, may be a unique identifier for the nuclei of the cell. To determine where to place the seed point on the membrane image (second image data 163), registration may be performed between the nuclei image (first image data 162) and the membrane image (second image data 163) to account for any degree of variation between the two images. The image is then decoded to identify each seed point.

In one embodiment, three sets of images may be used. The first is a mRNA image, which is used for decoding. The second set of images is the nuclei image. The third set of image is the membrane image.

The first image data 162 may be input into nuclei finder 167, which may include a trained neural network. Based on the first image data 162, nuclei finder 167 outputs information identifying locations of nuclei and optionally segmenting the disparate nuclei in the image. In one embodiment, the nuclei finder 167 outputs one or more masks (e.g., cell nuclei map 169 or seed points) with segmentation information for one or more of the detected nuclei.

Once the nuclei are detected, the nuclei location information from the cell nuclei map 169 may be inputted into the membrane finder 165 along with the second image data 163. The second image data 163 may be of a same sample as the first image data 162, but may have a different stain.

Membrane finder 165 may perform one or more operations using cell nuclei map 169 and the second image data 163 to determine the boundaries of cell membranes around each of the cell nuclei identified by the nuclei finder 167. In one embodiment, the first image data 161, the second image data 163 and the cell nuclei map 169 are inputted into the membrane finder 165, and membrane finder 165 may perform one or more operations to determine the boundaries of cell membranes around each of the cell nuclei identified by the nuclei finder 167. In one embodiment, membrane finder 165 includes a trained machine learning model that has been trained to receive a stained image of cell membranes, cell nuclei information (e.g., cell nuclei map), and/or an additional stained image of cell nuclei, and to output segmentation information for cell membranes. The segmentation information may be output as one or more masks and/or maps, for example.

In one embodiment, membrane finder 165 performs watershed segmentation using the nuclei as a seed point. During watershed segmentation, a watershed algorithm may be applied to the areas in which a seed point is indicated. In image processing, a watershed is a transformation defined on an image such as a greyscale image. The name watershed refers metaphorically to a geological watershed, or drainage divide, which separates adjacent drainage basins. The watershed transformation treats the image it operates upon like a topographic map, with the brightness of each point representing its height, and finds the lines that run along the tops of ridges. Starting from user-defined markers (i.e., the nuclei locations), the watershed algorithm treats pixel values as a local topography (elevation). The algorithm floods basins from the markers until basins attributed to different markers meet on watershed lines. In many cases, markers are chosen as local minima of the image, from which basins are flooded. Thus, "water" begins filling around each seed point until the "water" associated with one seed point encounters "water" associated with an adjacent seed point. The edge of the area where the "water" associated with one seed point borders on the "water" associated with an another seed point is understood as being the membrane of a cell.

The membrane of each cell is also known as the outer boundary of the cell. Watershed segmentation detects the outer boundary of the cell, i.e. the cell membrane. It can be important to accurately locate the cell nuclei to enable the watershed algorithm to function properly. For example, if there are more seed points than cell nuclei, then over-segmenting may occur, while if there are fewer seed points than cell nuclei, then under-segmenting may occur.

Membrane finder 165 outputs a cell map 170 that includes segmentation information of the membranes for each of the cells in the first image data 162 and/or second image data 163. The cell map 170 may be, for example, a mask that indicates, for each pixel of second image data 163, which cell that pixel is associated with. The cell map 170 may be usable to perform further analysis. For example, the cell map 170 may be used to perform cell transcriptomics analysis.

In some embodiments, information from cell map 170 may be added to second image data 163. The updated second image data and/or the cell map 170 may then undergo post processing by membrane finder 165 or another component. In post processing, the membrane boundary is smoothed. In one embodiment, a cost function is applied to the boundaries of the cell membranes to perform the smoothing. Alternatively, or additionally, other smoothing operations may be performed. It has been found that the cell boundaries initially output by membrane finder 165 may be irregular. However, in nature cell membranes are typically smooth. Accordingly, by smoothing out the boundaries the accuracy of the cell boundaries can be improved. Further, membrane finder 165 may find one or more cell membranes with a membrane size that is much larger than expected. Such large cell membranes may in fact be a group of cells that were incorrectly identified as a single cell. In embodiments, membrane finder 165 or another component may perform post processing to remove these cells from the result. In one embodiment, the size of each cell is compared to a cell size threshold. Those cells having a cell size that exceeds the cell size threshold may be filtered out and removed. After these outliers are removed, a smoothing function may be applied to the membrane boundaries. Post processing may also remove any erroneous segmentation.

Once the output is received from post processing, genes may be determined within the membranes. The membranes may be associated with specific cells that they are surrounding.

As described above, the nuclei detection may be performed by nuclei finder 167 using a trained machine learning model such as a CNN (e.g., a Mask R-CNN). In embodiments of the present disclosure, the trained machine learning model may have a single variable or parameter that can be user defined according to knowledge about a sample that has been imaged. The single variable or parameter may be an average cell size in embodiments. The single variable of average cell size may be inputted into the trained machine learned model to increase an accuracy of the trained machine learning model's output for a given input. By using a single parameter associated with average cell size, the same trained machine learning model can be used for many different types of biological samples that have disparate cell sizes.

For example, in one sample there may be cells with various sizes, such as a diameter of 50 pixels, 60 pixels, 70 pixels, 80 pixels, 90 pixels, 100 pixels, 110 pixels, 120 pixels, 130 pixels, 140 pixels, 150 pixels, 160 pixels, 170 pixels, 180 pixels, 190 pixels, 200 pixels or greater. To better accommodate the various sizes of cell diameters, the machine learning model may be configured to have an adjustable parameter associated with cell size. By tuning a single parameter associated with cell size, this in turn automatically tunes the nuclei segmentation and later membrane segmentation for accurate nuclei detection and membrane detection. By having accurate nuclei detection, the membrane segmentation will also be optimized.

In some embodiments, the single parameter that may be tuned is the average cell size. The user may manually input the single parameter of average cell size into the machine learning model. In some embodiments, average cell size is automatically determined by an additional trained machine learning model that may process the first image data 162 and/or second image data 163 prior to the first image data 162 being processed by nuclei finder 167. Alternatively, image processing may be performed on the first image data 162 and/or second image data 163 to determine the average cell size. Such trained machine learning model and/or image processing can be added to the system to analyze a biological sample, and can be applied to reduce a level of user input associated with analyzing a biological sample and gene sequencing and/or to simplify nuclei and membrane detection. For example, if a trained machine learning model is not used, the user may measure the diameter of four or five cells through a microscope. Based on this measurement, the user determines the average cell size to be inputted into nuclei finder 167.

Figure 1B:
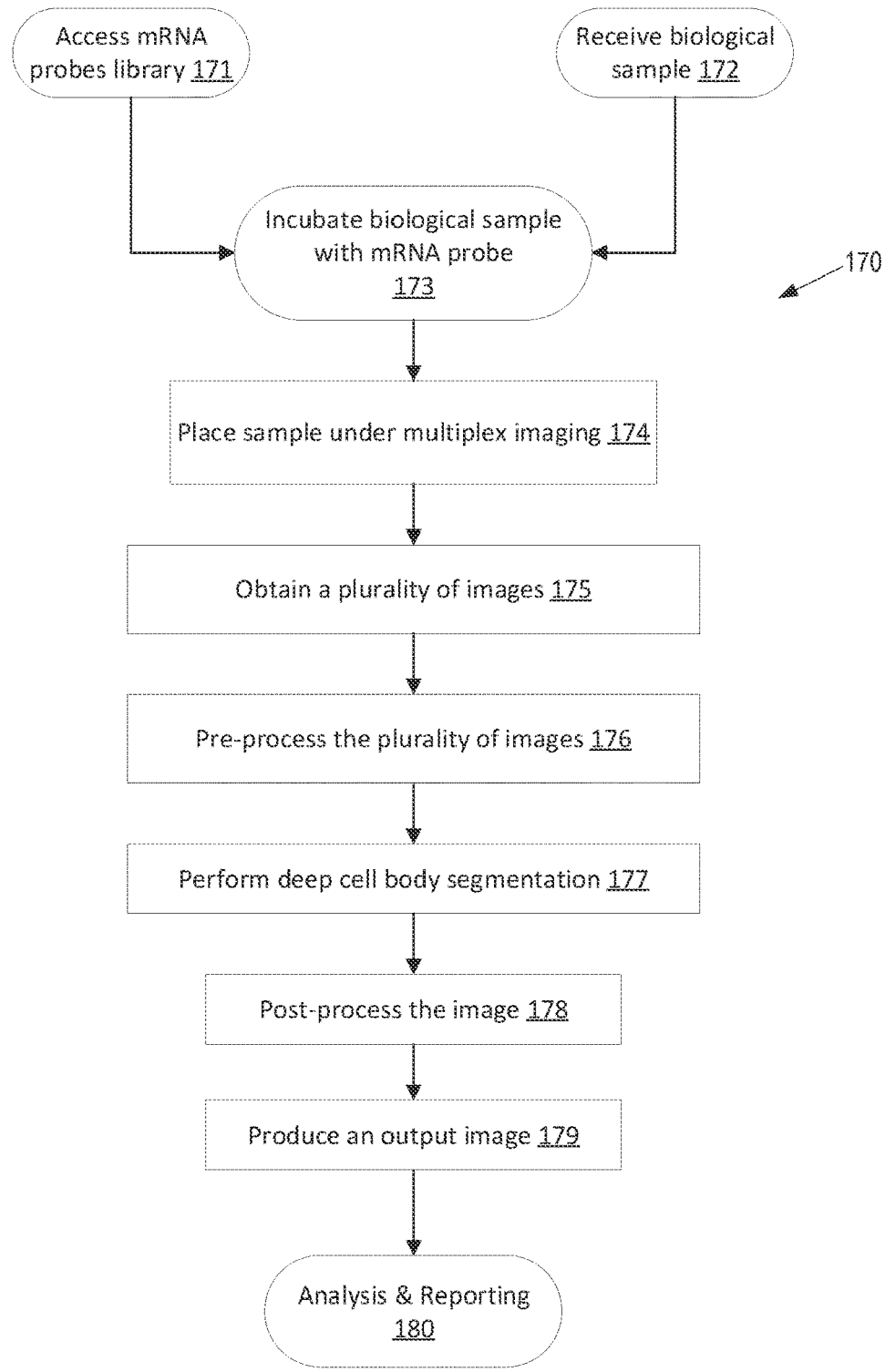
FIG. 1B illustrates a flow chart of a method for performing data acquisition and processing for single cell spatial transcriptomics, in accordance with embodiments of the present disclosure.

FIG. 1B illustrates a flow chart of a method 170 for performing data acquisition and processing for single cell spatial transcriptomics, in accordance with embodiments of the present disclosure. To begin, a biological sample is gathered for analysis at block 172. The biological sample may be a tissue resection, a biopsy or cells grown in culture. An mRNA probes library may be accessed at block 171 to obtain target mRNA probes. Then, the biological sample may be incubated with the target mRNA probe reagents at block 173. During incubation, the mRNA probe binds to genes in the biological sample and a fluorescence label is used to identify nuclei. After an incubation period, the biological sample is then placed in a device to perform multiplex imaging at block 174. The multiplex imaging process will be described in detail below. During the multiplex imaging, a plurality of images of the sample are obtained at a plurality of different combinations of imaging parameters using the multiplex imager at block 175.

After being multiplexed, the plurality of images are then preprocessed and decoded at block 176. During pre-processing, artifacts are removed from the plurality of images. Then, deep cell body segmentation, as will be later described, is performed at block 177. After deep cell body segmentation, the image undergoes post-processing at block 178. Then, an output image is produced at block 179. Finally, the biological sample is then analyzed and a report is prepared detailing cell classifications at block 180.

Figure 4:
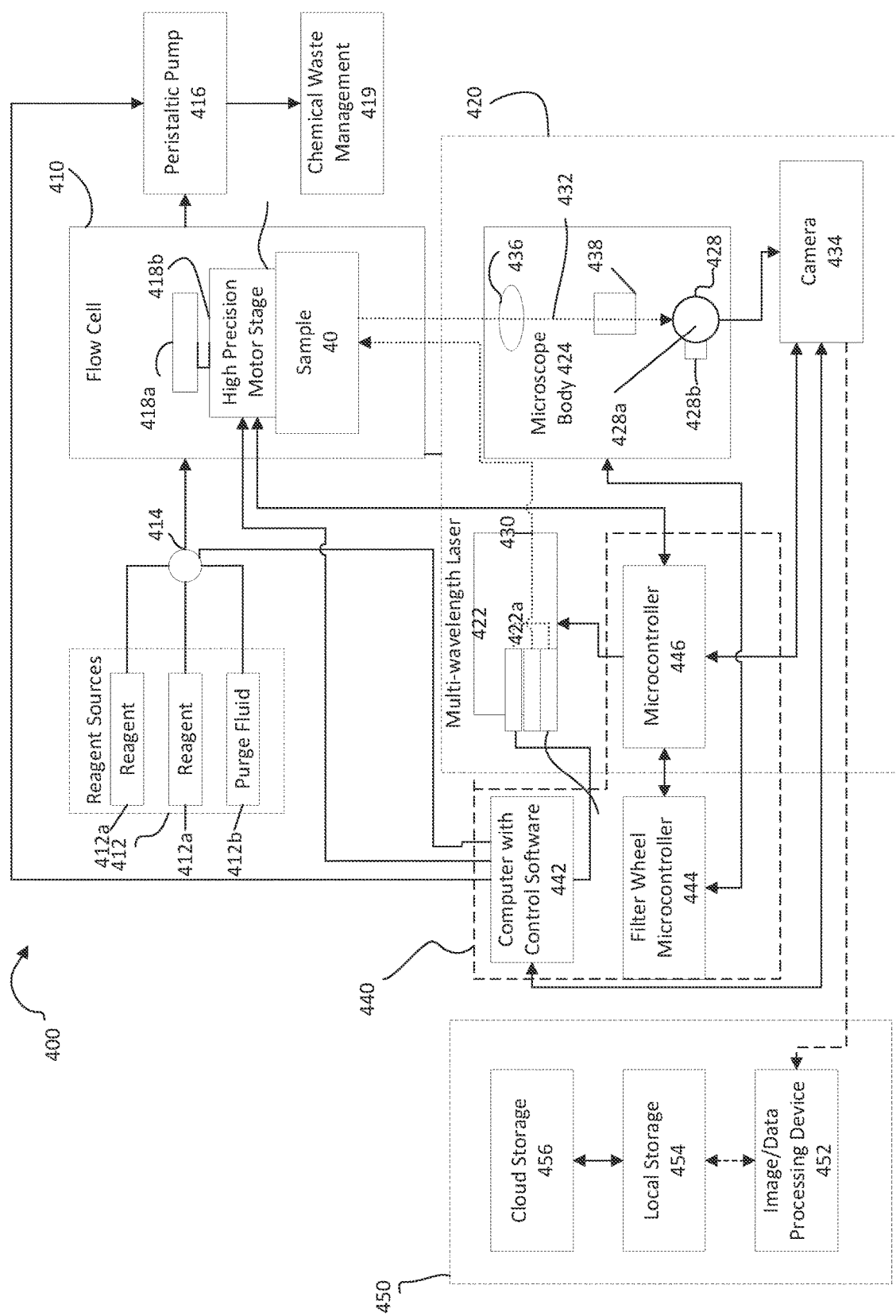
FIG. 4 is a schematic diagram of an apparatus for performing multiplexed fluorescence in-situ hybridization imaging, in accordance with embodiments of the present disclosure.

Referring to FIG. 4, a schematic diagram of an apparatus for multiplexed fluorescence in-situ hybridization imaging is illustrated. A multiplexed fluorescent in-situ hybridization (mFISH) imaging and image processing apparatus 400 includes a flow cell 410 to hold a sample 40, a fluorescence microscope 420 to obtain images of the sample 40, and a control system 440 to control operation of the various components of the mFISH imaging and image processing apparatus 400. The control system 440 can include a computer 442, e.g., having a memory, processor, etc., that executes control software.

The fluorescence microscope 420 includes an excitation light source 422 that can generate excitation light 430 of multiple different wavelengths. In particular, the excitation light source 422 can generate narrow-bandwidth light beams having different wavelengths at different times. For example, the excitation light source 422 can be provided by a multi-wavelength continuous wave laser system, e.g., multiple laser modules 422a that can be independently activated to generate laser beams of different wavelengths. Output from the laser modules 422a can be multiplexed into a common light beam path.

The fluorescence microscope 420 includes a microscope body 424 that includes the various optical components to direct the excitation light from the light source 422 to the flow cell 410. For example, excitation light from the light source 422 can be coupled into a multimode fiber, refocused and expanded by a set of lenses, then directed into the sample by a core imaging component, such as a high numerical aperture (NA) objective lens 436. When the excitation channel needs to be switched, one of the multiple laser modules 422a can be deactivated and another laser module 422a can be activated, with synchronization among the devices accomplished by one or more microcontrollers 444, 446.

The objective lens 436, or the entire microscope body 424, can be installed on a vertically movable mount coupled to a Z-drive actuator. Adjustment of the Z-position, e.g., by a microcontroller 446 controlling the Z-drive actuator, can enable fine tuning of focal position. Alternatively, or in addition, the flow cell 410 (or a stage 418b supporting the sample in the flow cell 410) could be vertically movable by a Z-drive actuator 418a, e.g., an axial piezo stage. Such a piezo stage can permit precise and swift multi-plane image acquisition.

The sample 40 to be imaged is positioned in the flow cell 410. The flow cell 410 can be a chamber with cross-sectional area (parallel to the object or image plane of the microscope) with and area of about 2 cm by 2 cm. The sample 40 can be supported on a stage 418b within the flow cell, and the stage (or the entire flow cell) can be laterally movable, e.g., by a pair of linear actuators 418a to permit XY motion. This permits acquisition of images of the sample 40 in different laterally offset fields of view (FOVs). Alternatively, the microscope body 424 could be carried on a laterally movable stage.

An entrance to the flow cell 410 is connected to a set of hybridization reagent sources 412. A multi-valve positioner 414 can be controlled by the controller 440 to switch between sources to select which reagent 412a is supplied to the flow cell 410. Each reagent includes a different set of one or more oligonucleotide probes. Each probe targets a different RNA sequence of interest, and has a different set of one or more fluorescent materials, e.g., phosphors, that are excited by different combinations of wavelengths. In addition to the reagents 412a, there can be a source of a purge fluid 412b, e.g., DI water.

An exit to the flow cell 410 is connected to a pump 416, e.g., a peristaltic pump, which is also controlled by the controller 440 to control flow of liquid, e.g., the reagent or purge fluid, through the flow cell 410. Used solution from the flow cell 410 can be passed by the pump 416 to a chemical waste management subsystem 419.

In operation, the controller 440 causes the light source 422 to emit the excitation light 430, which causes fluorescence of fluorescent material in the sample 40, e.g., fluorescence of the probes that are bound to RNA in the sample and that are excited by the wavelength of the excitation light. The emitted fluorescent light 432, as well as back propagating excitation light, e.g., excitation light scattered from the sample, stage, etc., is collected by an objective lens 436 of the microscope body 424.

The collected light can be filtered by a multi-band dichroic mirror 438 in the microscope body 424 to separate the emitted fluorescent light from the back propagating illumination light, and the emitted fluorescent light is passed to a camera 434. The multi-band dichroic mirror 438 can include a pass band for each emission wavelength expected from the probes under the variety of excitation wavelengths. Use of a single multi-band dichroic mirror (as compared to multiple dichroic mirrors or a movable dichroic mirror) can provide improved system stability.

The camera 434 can be a high resolution (e.g., 2048×2048 pixel) CMOS (e.g., a scientific CMOS) camera, and can be installed at the immediate image plane of the objective. Other camera types, e.g., CCD, may be possible. When triggered by a signal, e.g., from a microcontroller, image data from the camera can be captured, e.g., sent to an image processing system 450. Thus, the camera 434 can collect a sequence of images from the sample.

To further remove residual excitation light and minimize cross talk between excitation channels, each laser emission wavelength can be paired with a corresponding band-pass emission filter 428a. Each filter 428a can have a wavelength of 10-50 nm, e.g., 14-32 nm. In some implementations, a filter is narrower than the bandwidth of the fluorescent material of the probe resulting from the excitation, e.g., if the fluorescent material of the probe has a long trailing spectral profile.

The filters are installed on a high-speed filter wheel 428 that is rotatable by an actuator 428b. The filter wheel 428 can be installed at to minimize optical aberration in the imaging path. After passing the emission filter of the filter wheel 428, the cleaned fluorescence signals can be refocused by a tube lens and captured by the camera 434. The dichroic mirror 438 can be positioned in the light path between the objective lens 436 and the filter wheel 428.

To facilitate high speed, synchronized operation of the system, the control system 440 can include two microcontrollers 444, 446 that are employed to send trigger signals, e.g., TTL signals, to the components of the fluorescence microscope 420 in a coordinated manner. The first microcontroller 444 is directly run by the computer 442, and triggers actuator 428b of the filter wheel 428 to switch emission filters 428a at different color channels. The first microcontroller 444 also triggers the second microcontroller 446, which sends digital signals to the light source 422 in order to control which wavelength of light is passed to the sample 40. For example, the second microcontroller 446 can send on/off signals to the individual laser modules of the light source 422 to control which laser module is active, and thus control which wavelength of light is used for the excitation light. After completion of switching to a new excitation channel, the second microcontroller 446 controls the motor for the piezo stage 418b to select the imaging height. Finally the second microcontroller 446 sends a trigger signal to the camera 434 for image acquisition.

Communication between the computer 442 and the device components of the apparatus 400 is coordinated by the control software. This control software can integrate drivers of all the device components into a single framework, and thus can allow a user to operate the imaging system as a single instrument (instead of having to separately control many devices).

The control software supports interactive operations of the microscope and instant visualization of imaging results. In addition, the control software can provide a programming interface which allows users to design and automate their imaging workflow. A set of default workflow scripts can be designated in a scripting language.

As a result, a fluorescence image is acquired for each combination of possible values for the z-axis, color channel (excitation wavelength), lateral FOV, and reagent. Because the innermost loop has the fastest adjustment time, and the successively surrounding loops are of successively slower adjustment time, this configuration provides the most time efficient technique to acquire the images for the combination of values for these parameters.

A data processing system 450 is used to process the images and determine gene expression to generate the spatial transcriptomic data. At a minimum, the data processing system 450 includes a data processing device 452, e.g., one or more processors controlled by software stored on a computer readable medium, and a local storage device 454, e.g., non-volatile computer readable media, that receives the images acquired by the camera 434. For example, the data processing device 452 can be a workstation with GPU processors or FPGA boards installed. The data processing system 450 can also be connected through a network to remote storage 456, e.g., through the Internet to cloud storage.

In some implementations, the data processing system 450 performs on-the-fly image processing as the images are received. In particular, while data acquisition is in progress, the data processing device 452 can perform image pre-processing steps, such as filtering and deconvolution, that can be performed on the image data in the storage device 454 but which do not require the entire data set. Because filtering and deconvolution are a major bottleneck in the data processing pipeline, pre-processing as image acquisition is occurring can significantly shorten the offline processing time and thus improve the throughput.

Figure 2:
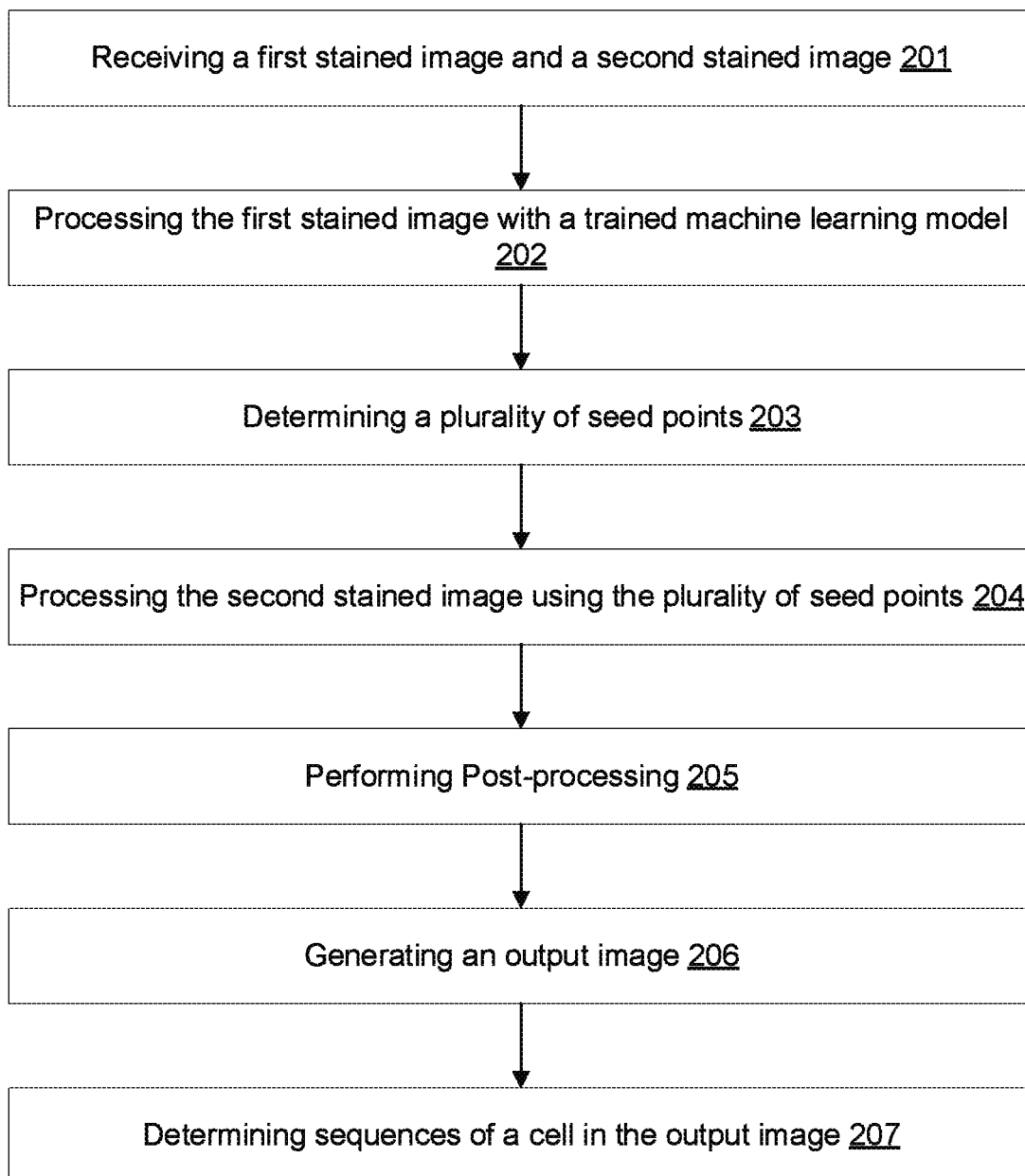
FIG. 2 illustrates another flow chart of a method for performing cell body segmentation, in accordance with embodiments of the present disclosure.

Referring to FIG. 2, a flow chart for a method 200 of the deep cell body segmentation according to an embodiment of the present disclosure is presented. After the plurality of images are preprocessed and decoded in block 176 of FIG. 1B, the sample then undergoes a deep cell body segmentation according to embodiments of the present disclosure. During this process, a first stained image and a second stained image are received by a data processing device at block 201. The first stained image is processed using a trained machine learning model at block 202 to perform nuclei segmentation. Prior to processing the first stained image, a parameter of the trained machine learning model may be set. The parameter may be an average cell size. The trained machine learning model outputs locations of a plurality of cell nuclei in the first stained image. The first stained image may be stained using a DAPI (4',6-diamidino phenylindole) stain, and the second stained image may be stained using a membrane stain in embodiments.

Then, a plurality of seed points are determined based on the locations of the plurality of cell nuclei at block 203. Each cell nuclei of the plurality of cell nuclei is associated with a seed point of the plurality of seed points. After determining the seed points, the second stained image is processed using the seed points at block 204. The image processing on the second stained image includes performing a watershed segmentation process in embodiments. After processing the second stained image, post-processing is performed on the second stained image at block 205. The post-processing includes smoothing boundaries representing one or more cell membranes of the plurality of cell membranes and/or removing a boundary representing a grouping of a subset of a plurality of cells.

After post-processing, an output image is generated that includes labels for the plurality of cell nuclei and the plurality of cell membranes at block 206. A data processing device can determine sequences of a cell in the output image at block 207, where the sequences are in an area within a cell membrane of the cell.

Figure 3:
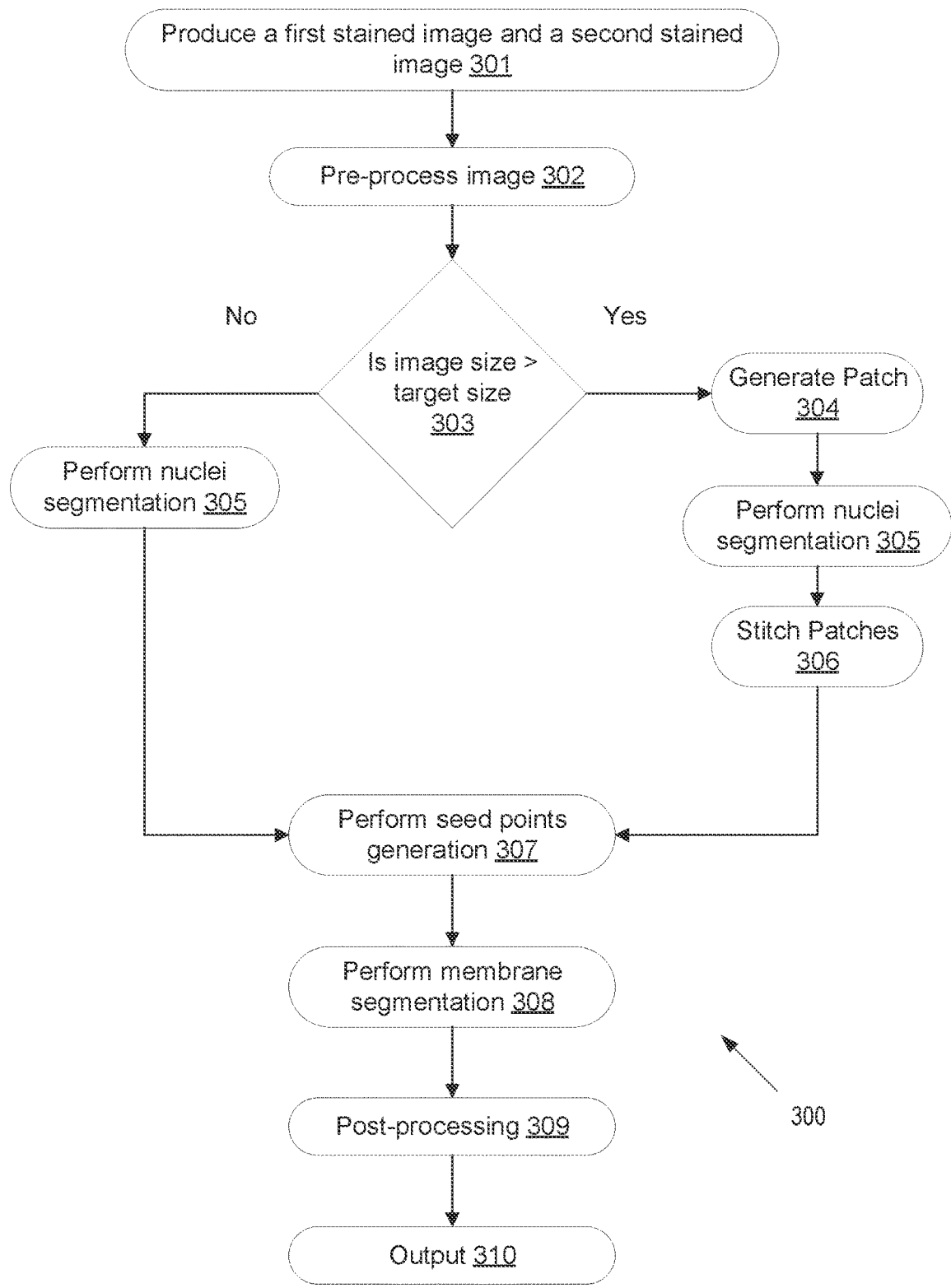
FIG. 3 illustrates a flow chart of a method for performing cell body segmentation, in accordance with embodiments of the present disclosure.

FIG. 3 illustrates a flow chart of a method 300 for another embodiment of the deep cell body segmentation. Similarly to the method 200 above, a first stained image and a second stained image are received by a data processing device at block 301. In one embodiment, the first stained image illustrates the stained nuclei of the cell and the second stained image illustrates the stained membrane of the cell. At block 302, the image is pre-processed to reduce noise in the image. After pre-processing, the processing logic analyzes the image to determine whether the image size is greater than a target size at block 303. In some embodiments, the target size may be about 512×512 or about 1024×1024. If the image size is the same size as or smaller than the target size, then nuclei segmentation is performed 305, as described in FIG. 5. In some embodiments, if the image size is smaller than the target size, then the image size is increased to the target size by adding padding. If the image size is greater than the target size, then the image is divided into patches such that the image is equal to or less than the target size at block 304. The patches may be overlapping patches having a size of, for example, 512×512. Nuclei segmentation is then performed on each of the image patches, as described above at block 305 and described below in FIG. 5.

In one embodiment, the nuclei segmentation performed at block 305 includes receiving a first stained image representing cell nuclei and using a trained machine learning model, and outputting a mask with pixel level labels indicating for each pixel whether or not that pixel represents a cell nucleus. If image patches were processed at block 305, then after nuclei segmentation the model stitches the patches back together at block 306 as described above. If the patches overlap, when they are stitched together the amount of artifacts may be reduced.

Once the image is whole, seed points generation may be performed at block 307 using the cell nuclei information. In 307, a plurality of seed points are determined based on the locations of the plurality of cell nuclei. Each cell nuclei of the plurality of cell nuclei is associated with a seed point of the plurality of seed points. After determining the seed points, the second stained image is processed using the seed points 307. After step 307, membrane segmentation is performed 308. Membrane segmentation may be performed using a watershed process that determines cell membrane boundaries for each cell nuclei. During membrane segmentation, every cell of the sample may be labelled with a unique label that uniquely identifies that cell. After performing membrane segmentation, post-processing of the image is done at block 309. During post-processing, the membrane boundaries may be smoothed. After post-processing, the image is then outputted to the analysis and reporting is performed to classify the cells in a sample step 110 of FIG. 1.

Figure 5:
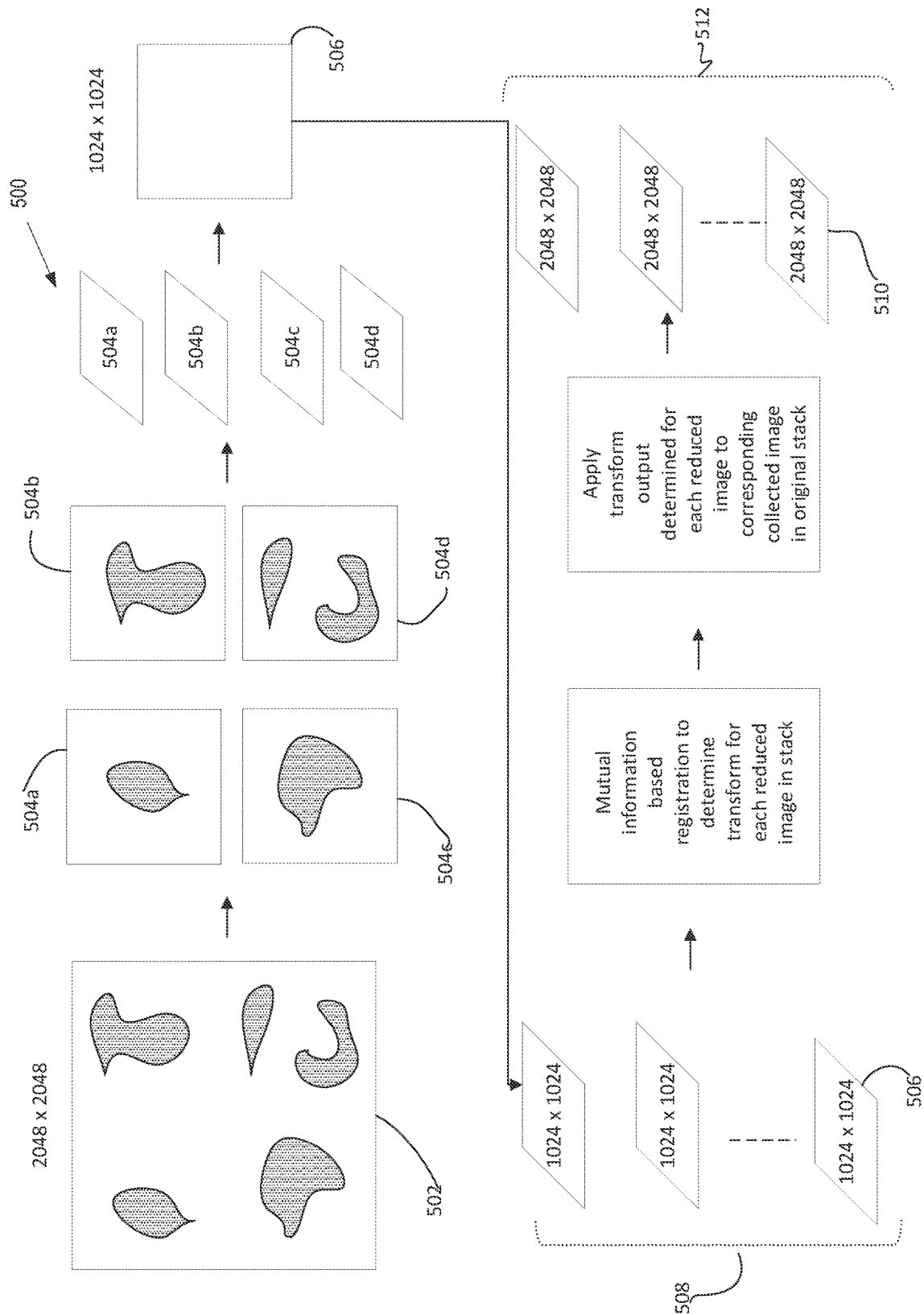
FIG. 5 schematically illustrates an image registration process that uses a mutual-information algorithm, in accordance with embodiments of the present disclosure.

Referring to FIG. 5, a process 500 for using a mutual-information (MI) algorithm to align collected images having the same field of view (FOV) that preserves high precision of the MI registration algorithm while reducing computational load is performed to register a first image (e.g., a nuclei image having a first stain) with a second image (e.g., a membrane image having a second stain). A set of collected images having the same FOV (e.g., first image data 162 and second image data 163) can be considered an original image stack, where the order of images in the stack may be set by a data schema. The data schema provides a rule for ordering the images based on hardware parameters so that the images may be placed into one or more image stacks in an appropriate order. If metadata is not included, the data schema can associate an order of the images with the values for a z-axis, color channel, lateral FOV and/or reagent used to generate that image. Each collected image 502 in the image stack may be, for example, 2048×2048 pixels or another size. In general, performing a mutual-information algorithm on an image of this size may use excessive computational power. In one embodiment, the collected image 502 is evenly sliced into multiple patches, for example four image patches 504a, 504b, 504c, 504d. In one embodiment, the collected image 502 is not divided into image patches. Assuming each collected image 502 is 2048×2048 pixels, then the image patches would be 1024×1024 pixels. Each image patch 504a, 504b, 504c, 504 d may be multiplied by a phase factor ϕ, the phase shifted image patches may be overlapped and summed to generate a complex image, and the real and imaginary parts of the complex image may be summed up to create a summed image 506. This summed image 506 may have ¼ size of the original image 502, e.g., 1024×1024 pixels.

This process may be repeated for each original image 502 in the original image stack to generate a stack 508 of images 506 of reduced size. The mutual-information algorithm may be then performed using the stack 508 to generate a transform for each reduced image 506 in the stack 508. The transform can include a translation and/or scaling transform. To align the images in the original stack, the transform determined for each reduced image may be applied to the corresponding collected image in the original stack. This should result in a stack 512 of collected images 510 of the original size, e.g., 2048×2048 pixels, in which the images 510 for the same FOV are in alignment.

This slice-and-overlap strategy preserves most of the features in the image and thus should still have high precision, but reduces the temporary image size for shift calculation and thus has reduced computational load. Although method 500 and the discussion above focuses on splitting the original image into four patches corresponding to upper right, lower right, upper left and lower left quadrants of the original image, another number of patches can be used, e.g., the image can be split into other shapes, e.g., rectangular rather than square, so long as the patches have the same dimensions. For example, the original image could be split into 8 image patches of 256×2048 pixels. In general, the image can be split into a rectangular grid having a plurality of columns and a plurality of rows, e.g., an equal number of columns and rows. The image can be split into N images, where $N=Z^2$ and Z is an even number integer (N=2 for the example in FIG. 5).

In another embodiment, a system for performing the deep cell body segmentation of the present disclosure is described herein. In some embodiments, the system includes a memory and a processing device. The processing device is coupled to the memory. The processing device is configured to receive a first stained image and a second stained image, process the first stained image with a trained machine learned model, determine a plurality of seed points and perform image processing on the second stained image using the plurality of seed points to determine a plurality of cell membranes. The trained machine learning model outputs locations of a plurality of cell nuclei in the first stained image. The plurality of seed points may be determined based on the locations of the plurality of cell nuclei. Each cell nuclei of the plurality of cell nuclei is associated with a seed point of the plurality of seed points. Each cell membrane of the plurality of cell membranes is associated with a cell nuclei of the plurality of cell nuclei. The system further includes setting a parameter, such as an average cell size of the trained machine learning model prior to processing the first stained image.

Figure 6:
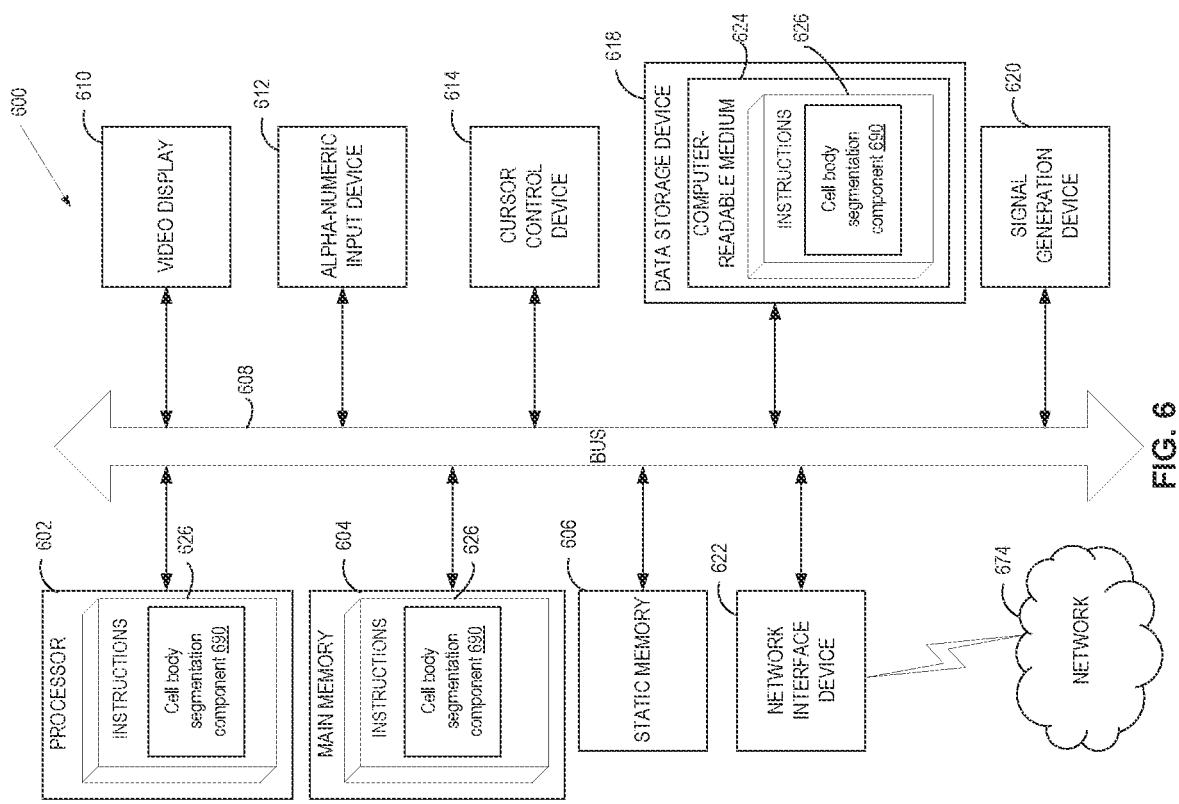
FIG. 6 is a block diagram illustrating a computer system, according to some embodiments.

FIG. 6 is a block diagram illustrating a computer system 600, according to certain embodiments. In some embodiments, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a Set-Top Box (STB), a Personal Digital Assistant (PDA), a cellular telephone, a web appliance, a server, a network router, switch or bridge, a wearable computing device, an augmented or virtual reality device, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., Random Access Memory (RAM)), a non-volatile memory 606 (e.g., Read-Only Memory (ROM) or Electrically-Erasable Programmable ROM (EEPROM)), and a data storage device 618, which may communicate with each other via a bus 608.

Processing device 602 may be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 600 may further include a network interface device 622 (e.g., coupled to network 674). Computer system 600 also may include a video display unit 610 (e.g., an LCD), an alphanumeric input device 612 (e.g., a keyboard), a cursor control device 614 (e.g., a mouse), and a signal generation device 620.

In some implementations, data storage device 618 may include a non-transitory computer-readable storage medium 624 (e.g., non-transitory machine-readable storage medium) storing instructions 626 encoding any one or more of the methods or functions described herein, including instructions encoding components such as cell body segmentation component 690 that may include one or more of the components of FIG. 1A.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "performing," "processing," "obtaining," "causing," "accessing," "determining," "adding," "using," "training," "initiating," "causing," "updating," or the like, refer to actions and processes performed or implemented by computer systems that manipulate and transform data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

As used herein, the singular forms "a," "an," and "the" include plural references unless the context clearly indicates otherwise. Thus, for example, reference to "a sample" includes a single sample as well as more than one sample.

As used herein, the term "about" or "approximately" in connection with a measured quantity refers to the normal variations in that measured quantity as expected by one of ordinary skill in the art in making the measurement and exercising a level of care commensurate with the objective of measurement and the precision of the measuring equipment. In certain embodiments, the term "about" includes the recited number±10%, such that "about 10" would include from 9 to 11.

Although the operations of the methods herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
   receiving a first image of a first stained sample and a second image of a second stained sample;
   processing the first image with a trained machine learned model, wherein the trained machine learning model outputs locations of a plurality of cell nuclei in the first stained image;
   determining a plurality of seed points based on the locations of the plurality of cell nuclei, wherein each cell nuclei of the plurality of cell nuclei is associated with a seed point of the plurality of seed points;
   processing the second image using the plurality of seed points to determine a plurality of cell membranes, wherein each cell membrane of the plurality of cell membranes is associated with a cell nuclei of the plurality of cell nuclei;
   generating an output image comprising labels for the plurality of cell nuclei and the plurality of cell membranes; and
   determining gene sequences of a cell in the output image, wherein the gene sequences are in an area within a cell membrane of the cell, the cell membrane being one of the plurality of cell membranes.

2. The method of claim 1, further comprising:
   setting an average cell size parameter of the trained machine learning model prior to processing the first image.

3. The method of claim 1, wherein processing the second image comprises performing a watershed segmentation process.

4. The method of claim 1, further comprising after processing the second image, performing one or more post-processing operations on the second image.

5. The method of claim 4, wherein the one or more post-processing operations include smoothing boundaries representing one or more cell membranes of the plurality of cell membranes.

6. The method of claim 4, wherein the one or more post-processing operations include removing a boundary representing a grouping of a subset of the plurality of cells.

7. The method of claim 1, wherein the first image is stained using a DAPI (4',6-diamidino-2-phenylindole) stain, and wherein the second image is stained using a membrane stain.

8. The method of claim 1, wherein the machine learned model comprises a Mask R-CNN neural network.

9. The method of claim 1, further comprising:
   gathering a biological sample;
   incubating the biological sample with a reagent; and
   obtaining a plurality of images of the biological sample, the plurality of images comprising the first image and the second image.

10. The method of claim 9, wherein the biological sample includes a tissue resection, a biopsy or cells grown in culture.

11. A system comprising:
    a memory; and
    a processing device operatively coupled to the memory, the processing device is configured to:
    receive a first image of a first stained sample and a second image of a second stained sample;
    process the first image with a trained machine learned model, wherein the trained machine learning model outputs locations of a plurality of cell nuclei in the first image;
    determine a plurality of seed points based on the locations of the plurality of cell nuclei, wherein each cell nuclei of the plurality of cell nuclei is associated with a seed point of the plurality of seed points; and
    process the second image using the plurality of seed points to determine a plurality of cell membranes, wherein each cell membrane of the plurality of cell membranes is associated with a cell nuclei of the plurality of cell nuclei,
    wherein the processing device is configured to generate an output image including labels for the plurality of cell nuclei and the plurality of cell membranes, and wherein the processing device is configured to determine gene sequences of a cell in the output image, wherein the gene sequences are in an area within a cell membrane of the cell, the cell membrane being one of the plurality of cell membranes.

12. The system of claim 11, wherein the processing device is configured to:
    receive a setting of an average cell size parameter of the trained machine learning model prior to processing the first image.

13. The system of claim 11, wherein the processing device is configured to perform a watershed segmentation process on the second image.

14. The system of claim 11, wherein the processing device is configured to perform one or more post-processing operations on the second image.

15. The system of claim 14, wherein the one or more post-processing operations include smoothing boundaries representing one or more cell membranes of the plurality of cell membranes, removing a boundary representing a grouping of a subset of the plurality of cells, or a combination thereof.

16. A non-transitory computer-readable medium comprising instructions that, when executed by a processor, cause the processor to perform operations comprising:
    receiving a first image of a first stained sample and a second image of a second stained sampled;
    processing the first image with a trained machine learned model, wherein the trained machine learning model outputs locations of a plurality of cell nuclei in the first stained image;
    determining a plurality of seed points based on the locations of the plurality of cell nuclei, wherein each cell nuclei of the plurality of cell nuclei is associated with a seed point of the plurality of seed points;
    processing the second image using the plurality of seed points to determine a plurality of cell membranes, wherein each cell membrane of the plurality of cell membranes is associated with a cell nuclei of the plurality of cell nuclei;
    generating an output image comprising labels for the plurality of cell nuclei and the plurality of cell membranes; and
    determining gene sequences of a cell in the output image, wherein the gene sequences are in an area within a cell membrane of the cell, the cell membrane being one of the plurality of cell membranes.

* * * * *